United States Patent
Hou et al.

(10) Patent No.: US 10,299,275 B2
(45) Date of Patent: May 21, 2019

(54) RANDOM ACCESS PROCEDURE WITH BEAMFORMING IN LTE

(71) Applicant: QUALCOMM Incorporated, San Diego, CA (US)

(72) Inventors: Jilei Hou, Beijing (CN); Neng Wang, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/773,869

(22) PCT Filed: Mar. 15, 2013

(86) PCT No.: PCT/CN2013/072758
§ 371 (c)(1),
(2) Date: Sep. 9, 2015

(87) PCT Pub. No.: WO2014/139174
PCT Pub. Date: Sep. 18, 2014

(65) Prior Publication Data
US 2016/0029358 A1    Jan. 28, 2016

(51) Int. Cl.
*H04W 72/04* (2009.01)
*H04W 74/08* (2009.01)
*H04B 7/06* (2006.01)

(52) U.S. Cl.
CPC ........ *H04W 72/046* (2013.01); *H04B 7/0695* (2013.01); *H04W 74/0833* (2013.01)

(58) Field of Classification Search
CPC ............ H04W 72/046; H04W 74/0833; H04B 7/0695
See application file for complete search history.

(56) References Cited

U.S. PATENT DOCUMENTS

| | | | |
|---|---|---|---|
| 8,165,595 B2 * | 4/2012 | Xia | H04B 7/0617 455/452.2 |
| 2006/0050742 A1 * | 3/2006 | Grandhi | H04B 7/0413 370/506 |
| 2010/0290407 A1 | 11/2010 | Uemura | |
| 2011/0045837 A1 | 2/2011 | Kim et al. | |
| 2012/0147813 A1 | 6/2012 | Visotsky et al. | |
| 2012/0314664 A1 | 12/2012 | Johansson et al. | |

(Continued)

FOREIGN PATENT DOCUMENTS

| | | | |
|---|---|---|---|
| CN | 101640922 A | | 2/2010 |
| CN | 101640922-(A) | * | 2/2010 |

(Continued)

OTHER PUBLICATIONS

Supplementary European Search Report—EP13878347—Search Authority—The Hague—Oct. 25, 2016.

(Continued)

*Primary Examiner* — Shailendra Kumar
(74) *Attorney, Agent, or Firm* — Austin Rapp

(57) ABSTRACT

A method for improved random access procedures by a UE is provided. The method comprises: measuring a common CSI-RS; selecting a best horizontal/vertical beam from a set of fixed beams; determining a preamble mapped to the selected horizontal/vertical beam; transmitting the preamble; and receiving a random access response.

32 Claims, 10 Drawing Sheets

(56) References Cited

U.S. PATENT DOCUMENTS

| | | | | |
|---|---|---|---|---|
| 2012/0320874 A1* | 12/2012 | Li | ................... | H04W 48/12 |
| | | | | 370/331 |
| 2014/0177607 A1* | 6/2014 | Li | ................... | H04W 74/0833 |
| | | | | 370/336 |
| 2014/0211731 A1 | 7/2014 | Inoue et al. | | |
| 2014/0286288 A1* | 9/2014 | Park | ................... | H04W 72/14 |
| | | | | 370/329 |
| 2015/0382205 A1* | 12/2015 | Lee | ................... | H04B 7/0417 |
| | | | | 370/329 |

FOREIGN PATENT DOCUMENTS

| | | | |
|---|---|---|---|
| CN | 101854638 A | 10/2010 | |
| CN | 101926103 A | 12/2010 | |
| JP | 2004072539 A | 3/2004 | |
| JP | 2009159214 A | 7/2009 | |
| JP | 2011120304 A | 6/2011 | |
| WO | 2009093871 A1 | 7/2009 | |
| WO | 2013024852 A1 | 2/2013 | |
| WO | 2014116928 A1 | 7/2014 | |

OTHER PUBLICATIONS

International Search Report and Written Opinion—PCT/CN2013/072758—ISA/EPO—dated Dec. 19, 2013.
CATT: "Support of Multiple Timing Advances in LTE-A Rel-11 with CA[online]," 3GPP TSG-RAN WG1#68b R1-121083, URL:http://www.3gpp.org/ftp/tsg_ran/WG1_RL1/TSGR1_68b/Docs/R1-121083.zip, Mar. 26, 2012.

* cited by examiner

RANDOM ACCESS PROCEDURE WITH BEAMFORMING IN LTE

TECHNICAL FIELD

The present disclosure relates generally to wireless communication systems. More specifically, the present disclosure relates to systems and methods for an improved random access procedure with beamforming in LTE.

BACKGROUND

Wireless communication systems are widely deployed to provide various types of communication content such as voice, video, data, and so on. These systems may be multiple-access systems capable of supporting simultaneous communication of multiple terminals with one or more base stations.

A problem that must be dealt with in all communication systems is fading or other interference. There may be problems with decoding the signals received. One way to deal with these problems is by utilizing beamforming. With beamforming, instead of using each transmit antenna to transmit a spatial stream, the transmit antennas each transmit a linear combination of the spatial streams, with the combination being chosen so as to optimize the response at the receiver.

Smart antennas are arrays of antenna elements, each of which receive a signal to be transmitted with a predetermined phase offset and relative gain. The net effect of the array is to direct a (transmit or receive) beam in a predetermined direction. The beam is steered by controlling the phase and gain relationships of the signals that excite the elements of the array. Thus, smart antennas direct a beam to each individual mobile unit (or multiple mobile units) as opposed to radiating energy to all mobile units within a predetermined coverage area (e.g., 120°) as conventional antennas typically do. Smart antennas increase system capacity by decreasing the width of the beam directed at each mobile unit and thereby decreasing interference between mobile units. Such reductions in interference result in increases in signal-to-interference and signal-to-noise ratios that improved performance and/or capacity. In power controlled systems, directing narrow beam signals at each mobile unit also results in a reduction in the transmit power required to provide a given level of performance.

Wireless communication systems may use beamforming to provide system-wide gains. In beamforming, multiple antennas on the transmitter may steer the direction of transmissions towards multiple antennas on the receiver. Beamforming may reduce the signal-to-noise ratio (SNR). Beamforming may also decrease the amount of interference received by terminals in neighboring cells. Benefits may be realized by providing improved beamforming techniques.

DETAILED DESCRIPTION

In the following description, for reasons of conciseness and clarity, terminology associated with the Long Term Evolution (LTE) standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B, and so forth. It should be noted that different terminologies apply to different technologies when applicable.

Figure 1:
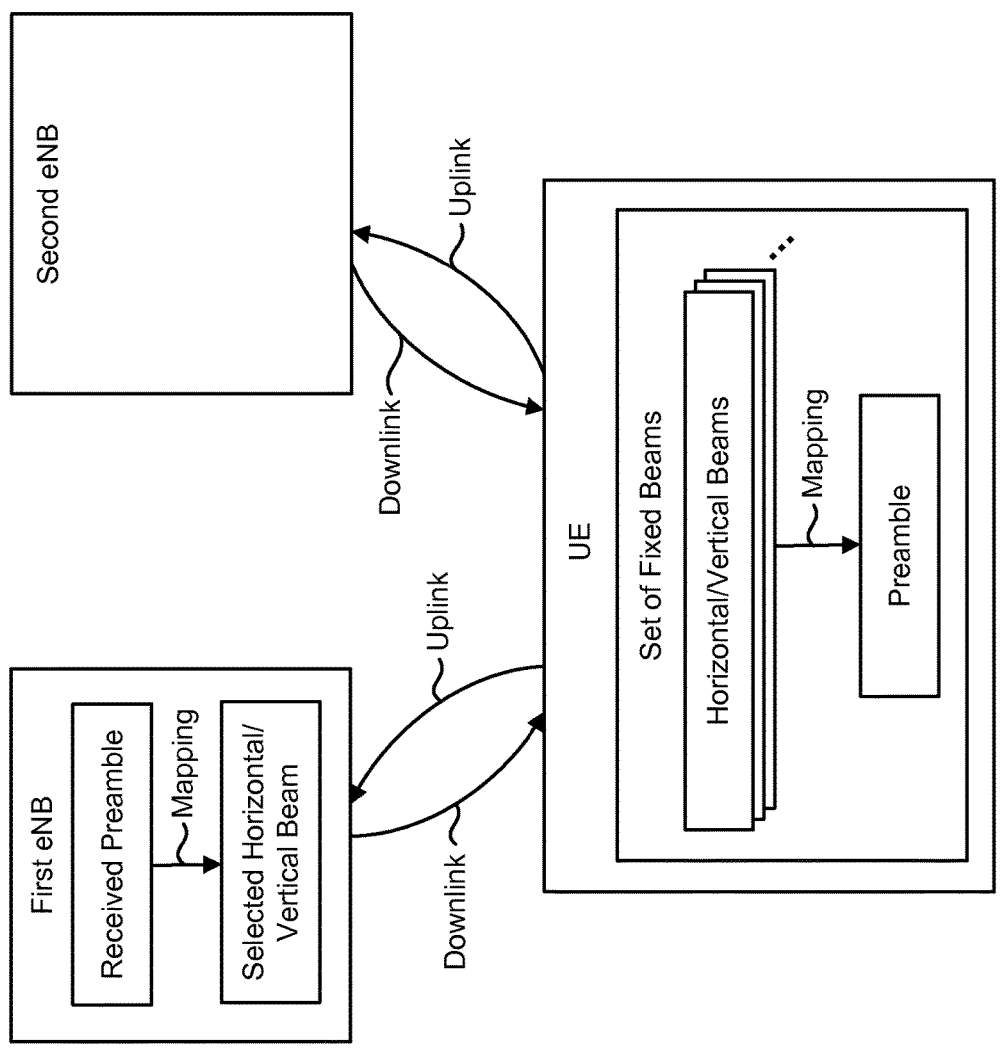
FIG. 1 shows a wireless communication system.

FIG. 1 shows a wireless communication system. Wireless communication systems are widely deployed to provide various types of communication content such as voice, data and so on. A wireless communication system may include multiple wireless devices. A wireless device may be an eNB or a UE. Both an eNB and a UE may be configured to improve common channel coverage and/or RRM measurement reliability for systems with large 2D arrays. 3D-MIMO technology may greatly improve system capacity by using a two-dimensional antenna array with a large number of antennas at the eNB. The eNB may then employ horizontal sectorization and/or vertical sectorization by using the 2D antenna array. Additional detail may be found in AppendixA.

A base station is a station that communicates with one or more wireless communication devices. A base station may also be referred to as, and may include some or all of the functionality of, an access point, a broadcast transmitter, a NodeB, an evolved NodeB (eNB), etc. The term "eNB" will be used herein. Each eNB provides communication coverage for a particular geographic area. An eNB may provide communication coverage for one or more UEs. The term "cell" can refer to an eNB and/or its coverage area, depending on the context in which the term is used.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system may utilize MIMO. A MIMO system may support both time division duplex (TDD) and frequency division duplex (FDD) systems. In a TDD system, uplink and downlink transmissions are in the same frequency region so that the reciprocity principle allows the estimation of the downlink channel from the uplink channel. This enables a transmitting wireless device to extract transmit beamforming gain from communications received by the transmitting wireless device.

The wireless communication system may be a multiple-access system capable of supporting communication with multiple UEs by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In 3GPP Long Term Evolution (LTE), a wireless communication device may be referred to as a "user equipment" (UE). A wireless communication device may also be referred to as, and may include some or all of the functionality of, a terminal, an access terminal, a subscriber unit, a station, etc. A UE may be a cellular phone, a personal digital assistant (PDA), a wireless device, a wireless modem, a handheld device, a laptop computer, etc.

A UE may communicate with zero, one or multiple eNBs on the downlink and/or uplink at any given moment. The downlink (or forward link) refers to the communication link from an eNB to a UE, and the uplink (or reverse link) refers to the communication link from a UE to an eNB. A UE may initiate the random access channel (RACH) process and transmit a physical random access channel (PRACH) preamble signature for initial network access. The UE may also initiate the RACH and transmit a PRACH preamble signature when the UE is not uplink synchronized but needing to send new uplink data or control information. In response to a successful PRACH preamble attempt, the eNB needs to transmit a random access response (RAR) carrying an initial uplink bandwidth assignment to the UE.

To improve RAR transmission in LTE, horizontal/vertical beamforming may be applied in the downlink. The associated PDDCH grant may be mapped to UE-specific search space. The first eNB (i.e., the serving eNB) may broadcast a common CSI-RS to all UEs. This allows the UEs to select the best horizontal/vertical beam from a set of fixed beams. Each horizontal/vertical beam may be mapped to a preamble. The mapping of the preamble to the fixed horizontal/vertical beams may be predefined so that the UE knows the preamble after selecting the horizontal/vertical beam.

The eNB may also know the mapping between a preamble and a selected horizontal/vertical beam. Thus, when the eNB receives the preamble from the UE, the eNB may determine the selected horizontal/vertical beam based on the received preamble. The eNB may then transmit a random access response (RAR) to the UE using the selected horizontal/vertical beam, increasing the probability that the UE will receive the RAR.

Figure 2:
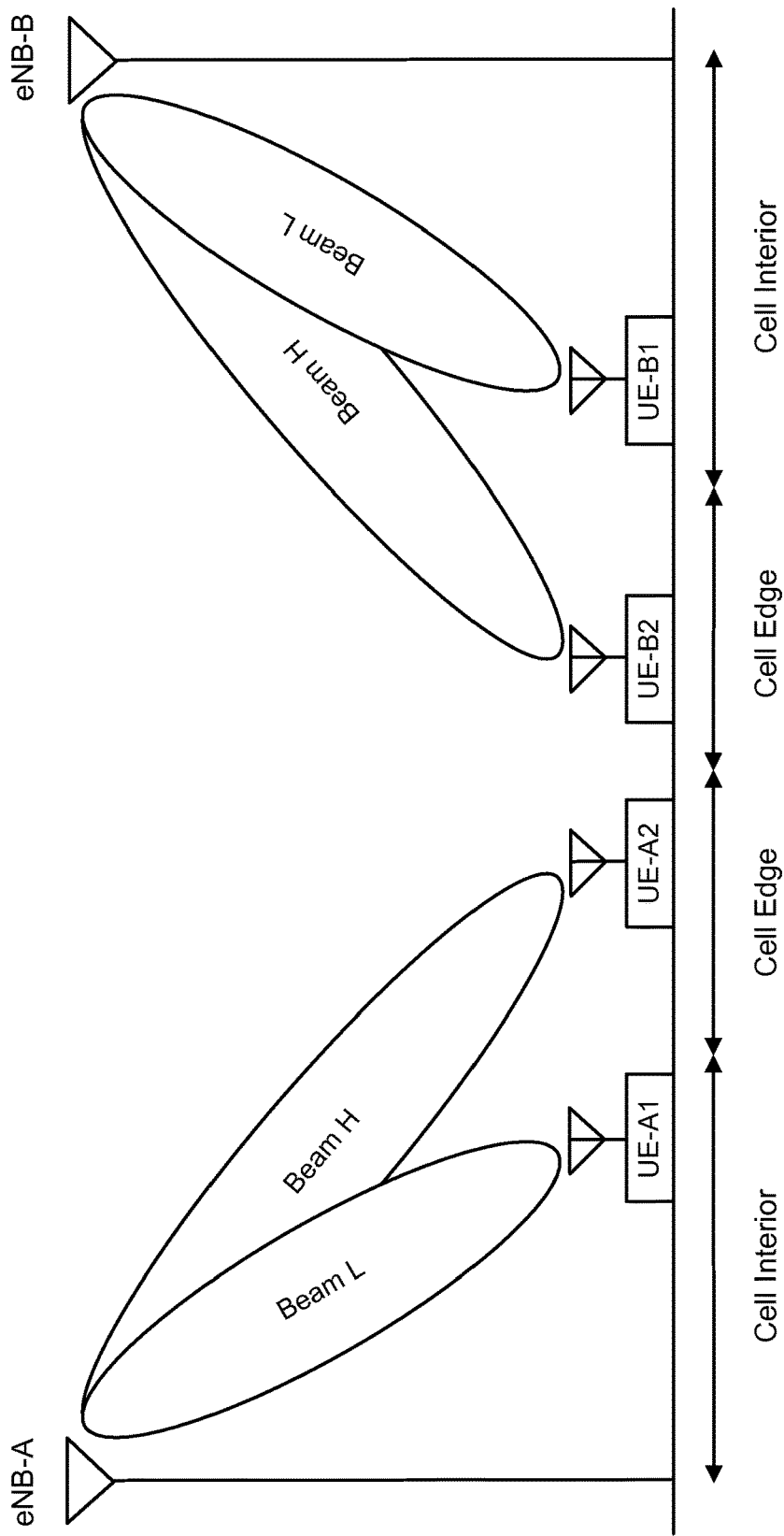
FIG. 2 is a block diagram illustrating vertical sectorization in a wireless communication system.

FIG. 2 is a block diagram illustrating vertical sectorization in a wireless communication system. The wireless communication system may include a first eNB eNB-A and a second eNB eNB-B. The wireless communication system may also include a first UE UE-A1 and a second UE UE-A2 that communicate with the first eNB eNB-A. The wireless communication system may further include a third UE UE-B1 and a fourth UE UE-B2 that communicate with the second eNB eNB-B.

The first UE UE-A1 may be located within the cell interior of the first eNB eNB-A, while the second UE UE-A2 is located on the cell edge of the first eNB eNB-A. Likewise, the third UE UE-B1 may be located within the cell interior of the second eNB eNB-B, while the fourth UE UE-B2 is located on the cell edge of the second eNB eNB-B. Vertical sectorization using a 2D antenna array allows the first eNB eNB-A to create two vertical sectors, Beam L and Beam H, rather than one azimuth sector. Likewise, the second eNB eNB-B may also create two vertical sectors, Beam L and Beam H. Horizontal sectorization may also be performed using the 2D antenna array.

Figure 3:
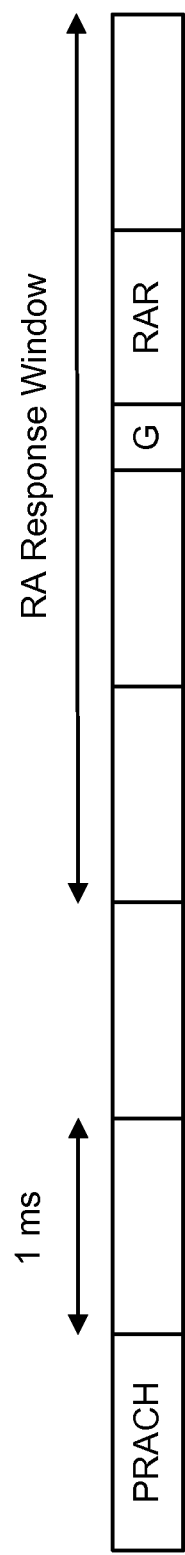
FIG. 3 is a block diagram illustrating the timing of an RAR window.

FIG. 3 is a block diagram illustrating the timing of an RAR window. The RAR includes the message on the physical downlink shared channel (PDSCH) and the associated downlink allocation message G on the physical downlink control channel (PDDCH) with the cyclic redundancy check (CRC) scrambled by the random access radio network temporary identity (RA-RNTI) and mapped to common search space. The RA-RNTI is decided by the sending timing (SubFrame) of the PRACH preamble by the UE, and is computed as: RA-RNTI=1+t_id+f_id, where t_id is the index of the first subframe of the specified PRACH ($0 \le t\_id < 10$), and f_id is the index of the specified PRACH within that subframe, in ascending order of frequency domain ($0 \le f\_id < 6$). The RAR is transmitted within a time window, where the start and end of the time window are configured by the eNB and the maximum time difference between the end of the RACH preamble and the RACH Response is only 12 subframes (12 ms), which is a tight timing requirement. If the UE does not receive the RAR within the configured time window, the UE will retransmit the preamble.

Because the RAR is typically broadcast in the whole cell, the UE that sends the preamble may not successfully decode the RAR if there is strong inter-cell interference. The grant PDCCH for the RAR message may be mapped to common search space, which corresponds to control channel elements (CCEs) 0-15 using downlink control information (DCI) format 1A. If there are multiple RARs transmitted in response to multiple preambles transmitted in different time and frequency resources (for time division duplexing (TDD), there are a maximum of six physical random access channels (PRACHs) in one transmission time interval (TTI)), then multiple RARs may be transmitted in different downlink subframes. If the RARs collide with other broadcast messages with DCI format 1A, some of the RARs may be postponed. This increases the random access delay and results in the dropping of the RAR, due to the unavailable PDCCH resource in the random access response time window.

Figure 4:
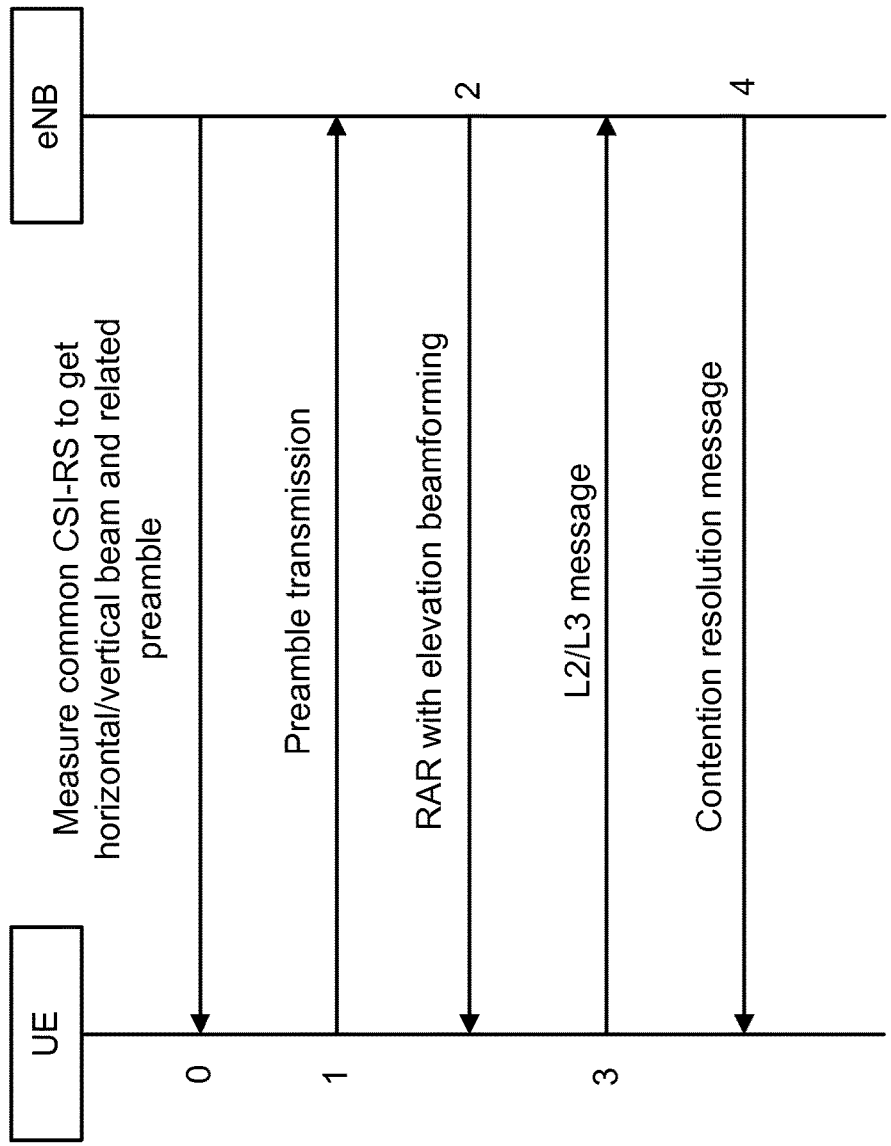
FIG. 4 is a block diagram illustrating a contention based random access procedure between a UE and an eNB.

FIG. 4 is a block diagram illustrating a contention based random access procedure between a UE and an eNB. In the contention based random access procedure shown, the horizontal/vertical beam information is included in the preamble transmitted by the UE to the eNB. The eNB may send a common channel state information reference signal (CSI-RS) to the UE. The UE may measure the common CSI-RS to obtain the horizontal/vertical beam and the related preamble (i.e., the preamble mapped to the selected horizontal/vertical beam).

The UE may then transmit the preamble to the eNB. The design of the preamble for supporting horizontal/vertical beamforming of the RAR may be accomplished using one of two options. In a first option, the 64 total preambles may be grouped into several groups, where each group corresponds to one horizontal/vertical beam. In a second option, a new preamble may be defined for each horizontal/vertical beam (e.g., 64 preambles per vertical beam). All the preamble sequences may be generated from the root sequence with consecutive logical indexes. The second option may increase the complexity of the eNB, due to the larger number of preambles that the eNB must search.

Upon receiving the preamble, the eNB can determine the selected horizontal/vertical beam, which is mapped to the preamble. The eNB can then transmit an RAR with horizontal/vertical beamforming to the UE. The RAR may include timing adjustments, the cell radio network temporary identity (Temporary C-RNTI), the uplink grant for L2/L3 messages, etc. The RAR may be addressed with the RA-RNTI. For horizontal/vertical beamforming, an enhanced RA-RNTI (i.e., E-RA-RNTI) may be defined to include the horizontal/vertical beam. The E-RA-RNTI may be used to map the PDCCH grant of the RAR to the UE-specific search space, e.g., E-RA-RNTI=1+t_id+ 10*f_id+64*beam_id. Upon receiving the RAR, the UE can transmit an L2/L3 message, such as an RRC Connection Request (MSG3), to the eNB. The eNB can then transmit a contention resolution message (e.g., an RRC Connection Setup (MSG4)) to the UE.

The RAR may be multicast to UEs that report the same horizontal/vertical beam, thereby improving the SINR for the received RAR. The E-RA-RNTI may be used for CRC scrambling of the PDCCH grant and also for UE-specific search space mapping. MSG4 can also be transmitted with the same horizontal/vertical beam to achieve beamforming gains and the benefit of a large number of transmit antennas. As used herein, horizontal/vertical refers to horizontal only, vertical only and/or joint horizontal and vertical beamforming.

The benefits of the methods herein may include improving the random access procedure for UE-specific horizontal/vertical beamforming to improve coverage and reduce collisions. This may include improved received SINR due to beamforming gain and reduced random access delay. Furthermore, the RAR collisions with other broadcast messages may be reduced, since the PDCCH grant for the RAR is mapped to the UE-specific search space. Changes may be required to the standards to achieve mapping of the preamble to horizontal/vertical beams, including changes to the specification of E-RA-RNTI.

Figure 5:
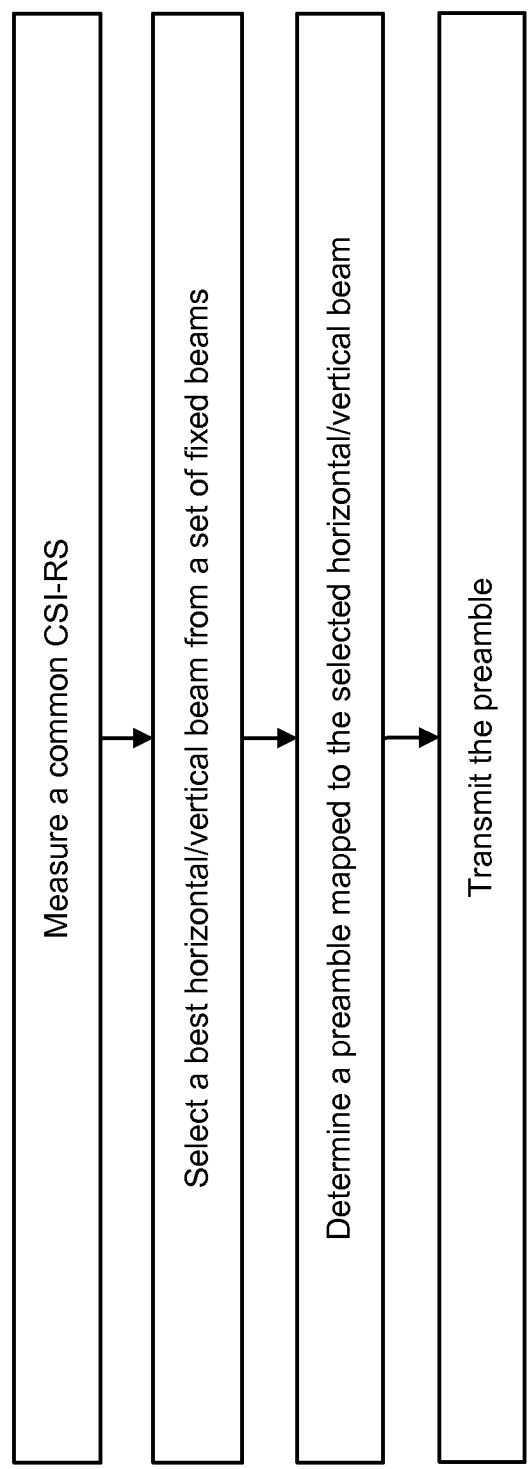
FIG. 5 is a flow diagram of a method for an improved random access procedure with beamforming in LTE.

FIG. 5 is a flow diagram of a method for an improved random access procedure with beamforming in LTE. The method may be performed by a UE. The UE may measure a common CSI-RS. The UE may select a best horizontal/vertical beam from a set of fixed beams. The UE may determine a preamble mapped to the selected horizontal/vertical beam. The UE may then transmit the preamble to an eNB.

Figure 6:
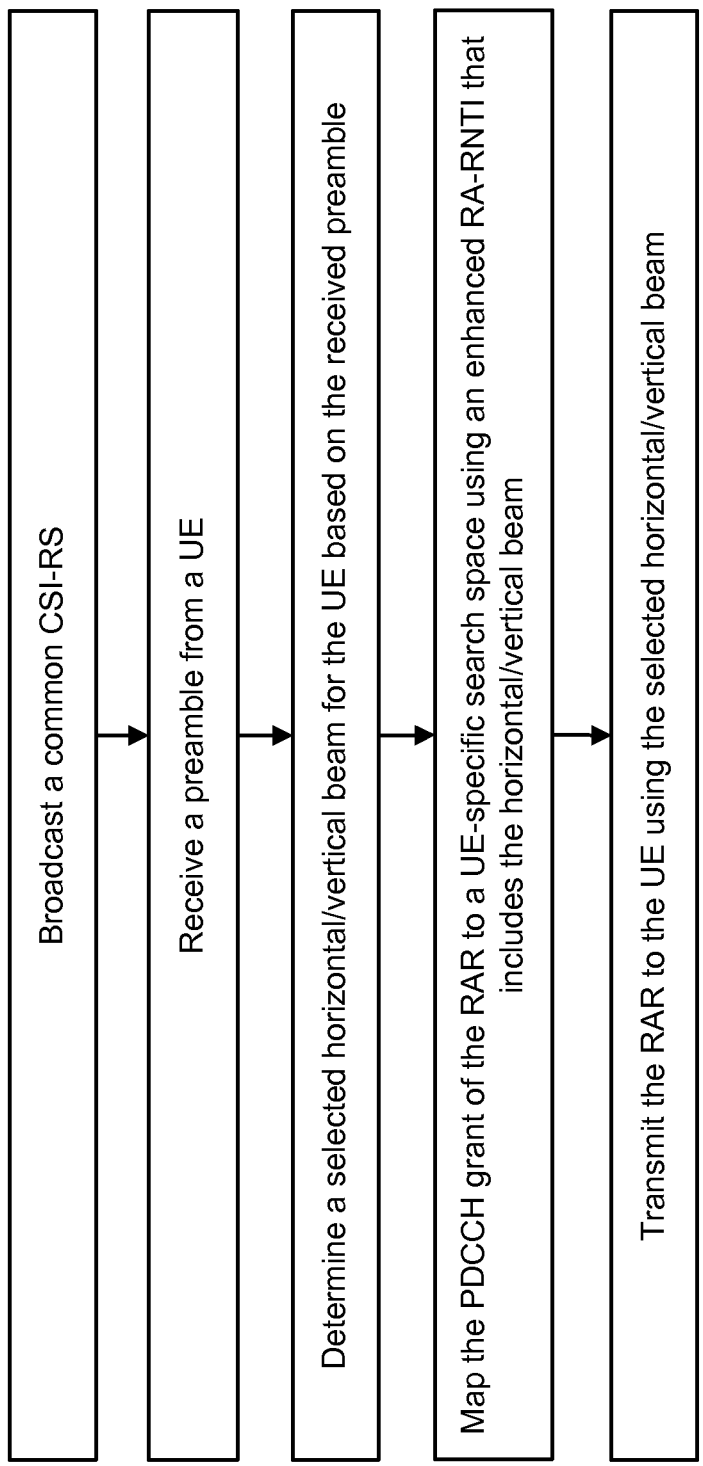
FIG. 6 is a flow diagram of another method for an improved random access procedure with beamforming in LTE.

FIG. 6 is a flow diagram of another method for an improved random access procedure with beamforming in LTE. The method may be performed by an eNB. The eNB may broadcast a common CSI-RS. The eNB may then receive a preamble from a UE. The eNB may determine a selected horizontal/vertical beam for the UE based on the received preamble. The eNB may map the PDCCH grant of the RAR to a UE-specific search space using an enhanced RA-RNTI that includes the horizontal/vertical beam. The eNB may then transmit the RAR to the UE using the selected horizontal/vertical beam.

Figure 7:
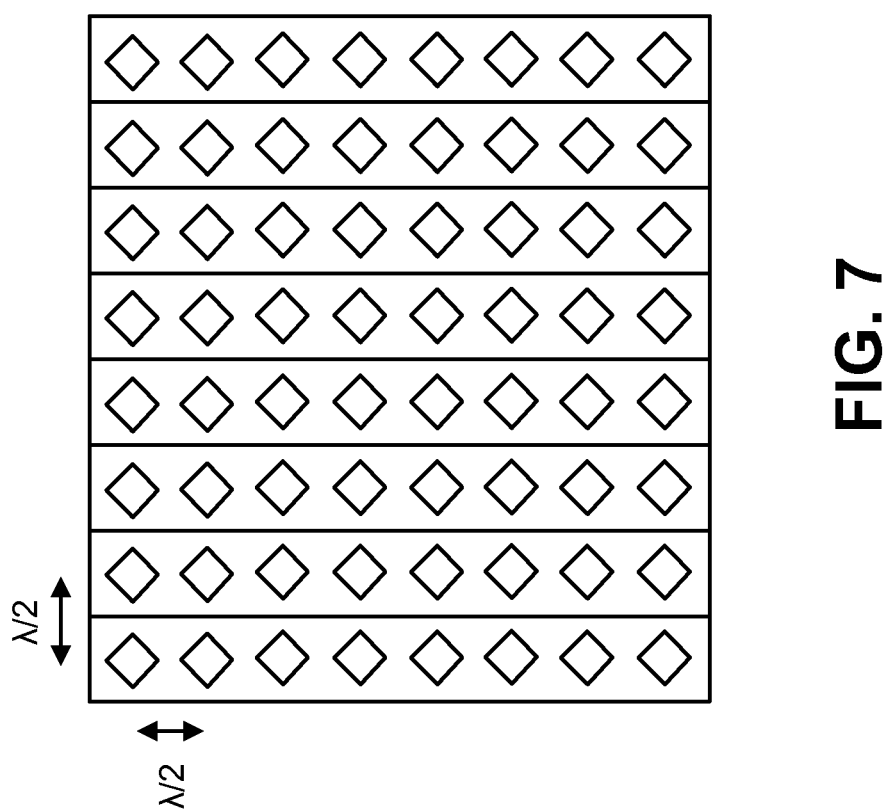
FIG. 7 is a block diagram illustrating a 2D antenna array.

FIG. 7 is a block diagram illustrating a 2D antenna array. The 2D antenna array shown is an 8×8 array with uniform antennas. Both azimuth and elevation elements may be active with individual transmitters and power amplifiers.

Figure 8:
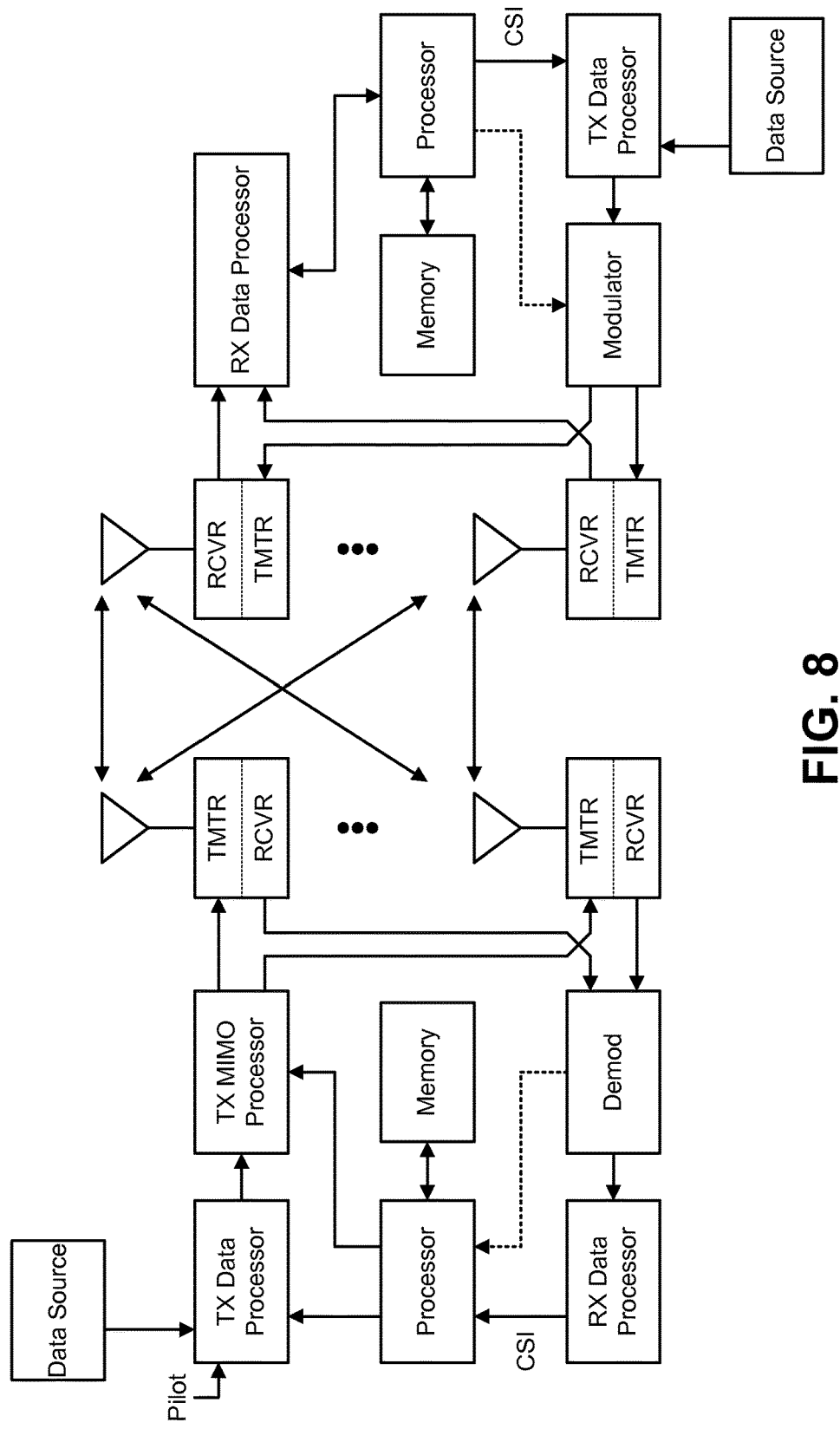
FIG. 8 is a block diagram of a transmitter and receiver in a multiple-input and multiple-output (MIMO) system.

FIG. 8 is a block diagram of a transmitter 1050 and receiver 1051 in a multiple-input and multiple-output (MIMO) system 1000. In the transmitter 1050, traffic data for a number of data streams is provided from a data source 1052 to a transmit (Tx) data processor 1053. Each data stream may then be transmitted over a respective transmit antenna 1056$a$-$t$. The transmit (Tx) data processor 1053 may format, code, and interleave the traffic data for each data stream based on a particular coding scheme selected for that data stream to provide coded data.

The coded data for each data stream may be multiplexed with pilot data using OFDM techniques. The pilot data may be a known data pattern that is processed in a known manner and used at the receiver 1051 to estimate the channel response. The multiplexed pilot and coded data for each stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by a processor.

The modulation symbols for all data streams may be provided to a transmit (TX) multiple-input multiple-output (MIMO) processor 1054, which may further process the modulation symbols (e.g., for OFDM). The transmit (TX) multiple-input multiple-output (MIMO) processor 1054 then provides NT modulation symbol streams to NT transmitters (TMTR) 1055$a$ through 1055$t$. The TX transmit (TX) multiple-input multiple-output (MIMO) processor 1054 may apply beamforming weights to the symbols of the data streams and to the antenna 1056 from which the symbol is being transmitted.

Each transmitter 1055 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 1055a through 1055t are then transmitted from NT antennas 1056a through 1056t, respectively.

At the receiver 1051, the transmitted modulated signals are received by NR antennas 1061a through 1061r and the received signal from each antenna 1061 is provided to a respective receiver (RCVR) 1062a through 1062r. Each receiver 1062 may condition (e.g., filter, amplify, and downconvert) a respective received signal, digitize the conditioned signal to provide samples, and further process the samples to provide a corresponding "received" symbol stream.

An RX data processor 1063 then receives and processes the NR received symbol streams from NR receivers 1062 based on a particular receiver processing technique to provide NT "detected" symbol streams. The RX data processor 1063 then demodulates, deinterleaves, and decodes each detected symbol stream to recover the traffic data for the data stream. The processing by RX data processor 1063 is complementary to that performed by TX MIMO processor 1054 and TX data processor 1053 at transmitter system 1050.

A processor 1064 may periodically determine which pre-coding matrix to use. The processor 1064 may store information on and retrieve information from memory 1065. The processor 1064 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 1067, which also receives traffic data for a number of data streams from a data source 1068, modulated by a modulator 1066, conditioned by transmitters 1062a through 1062r, and transmitted back to the transmitter 1050.

At the transmitter 1050, the modulated signals from the receiver are received by antennas 1056, conditioned by receivers 1055, demodulated by a demodulator 1058, and processed by an RX data processor 1059 to extract the reverse link message transmitted by the receiver system 1051. A processor 1060 may receive channel state information (CSI) from the RX data processor 1059. The processor 1060 may store information on and retrieve information from memory 1057. Processor 1060 may determine which pre-coding matrix to use for determining the beamforming weights and then process the extracted message.

Figure 9:
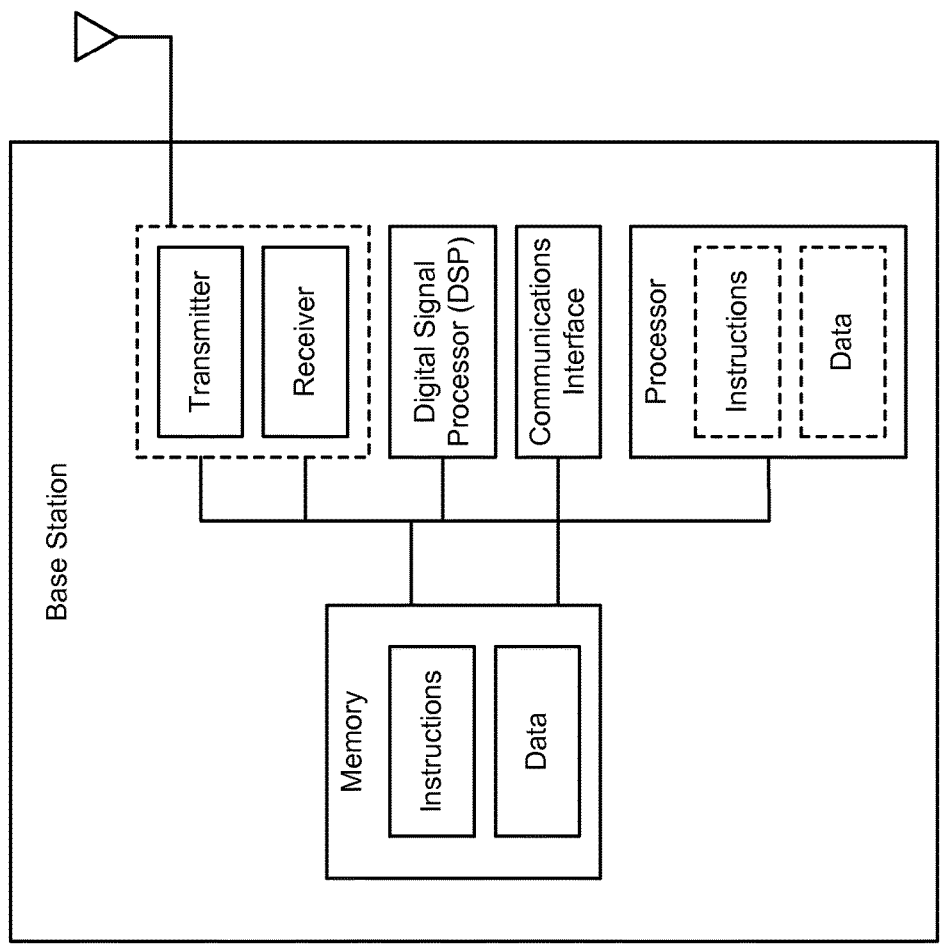
FIG. 9 illustrates certain components that may be included within a base station.

FIG. 9 illustrates certain components that may be included within a base station 1135. A base station 1135 may also be referred to as, and may include some or all of the functionality of, an access point, a broadcast transmitter, a Node B, an evolved Node B, etc. The base station 1135 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1135 of FIG. 9, in an alternative configuration, a combination of processors (e.g., an ARM and DSP) could be used.

The base station 1135 also includes memory 1105. The memory 1105 may be any electronic component capable of storing electronic information. The memory 1105 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109a may be loaded onto the processor 1103, and various pieces of data 1107a may be loaded onto the processor 1103.

The base station 1135 may also include a transmitter 1111 and a receiver 1113 to allow transmission and reception of signals to and from the base station 1135. The transmitter 1111 and receiver 1113 may be collectively referred to as a transceiver 1115. A first antenna 1117a and a second antenna 1117b may be electrically coupled to the transceiver 1115. The base station 1135 may also include (not shown) multiple transmitters, multiple receivers, multiple transceivers and/or additional antennas.

The various components of the base station 1135 may be coupled together by one or more buses, which may include a power bus, a control signal bus, a status signal bus, a data bus, etc. For the sake of clarity, the various buses are illustrated in FIG. 9 as a bus system 1119.

Figure 10:
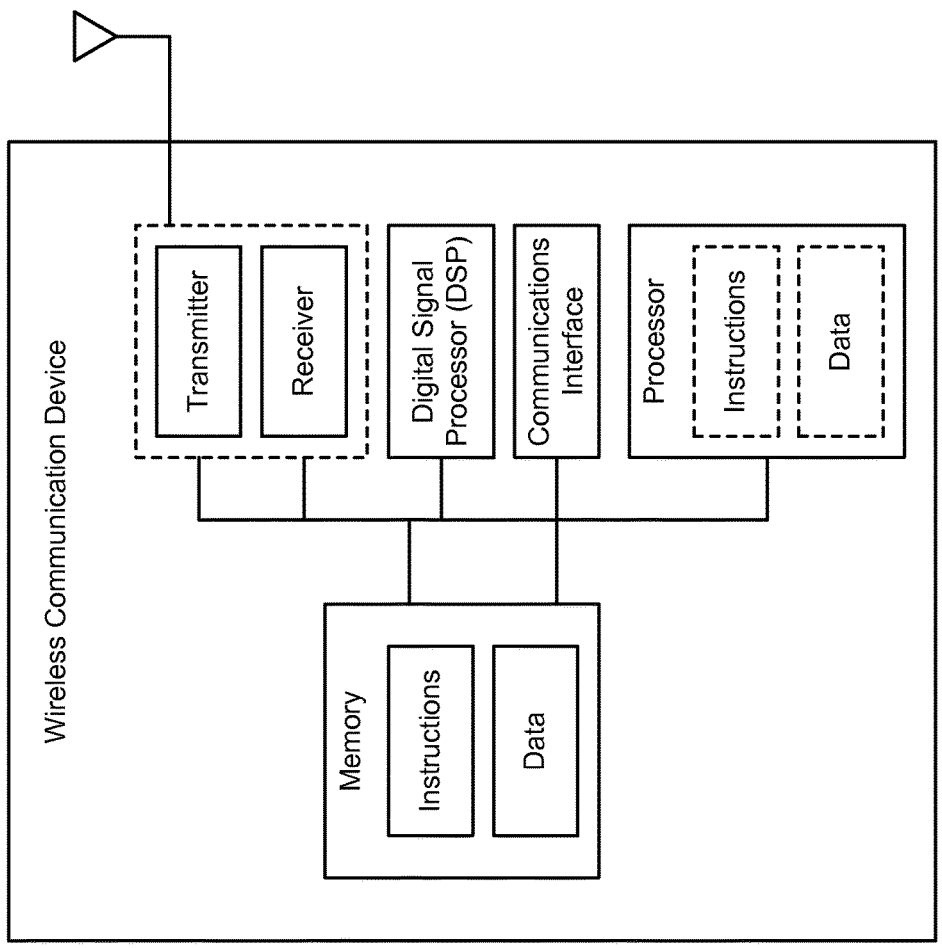
FIG. 10 illustrates certain components that may be included within a wireless communication device.

FIG. 10 illustrates certain components that may be included within a wireless communication device 1201. The wireless communication device 1201 may be an access terminal, a mobile station, a user equipment (UE), etc. The wireless communication device 1201 includes a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the wireless communication device 1201 of FIG. 10, in an alternative configuration, a combination of processors (e.g., an ARM and DSP) could be used.

The wireless communication device 1201 also includes memory 1205. The memory 1205 may be any electronic component capable of storing electronic information. The memory 1205 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1207 and instructions 1209 may be stored in the memory 1205. The instructions 1209 may be executable by the processor 1203 to implement the methods disclosed herein. Executing the instructions 1209 may involve the use of the data 1207 that is stored in the memory 1205. When the processor 1203 executes the instructions 1209, various portions of the instructions 1209a may be loaded onto the processor 1203, and various pieces of data 1207a may be loaded onto the processor 1203.

The wireless communication device 1201 may also include a transmitter 1211 and a receiver 1213 to allow transmission and reception of signals to and from the wireless communication device 1201. The transmitter 1211 and receiver 1213 may be collectively referred to as a transceiver 1215. A first antenna 1217*a* and a second antenna 1217*b* may be electrically coupled to the transceiver 1215. The wireless communication device 1201 may also include (not shown) multiple transmitters, multiple receivers, multiple transceivers and/or additional antennas.

The various components of the wireless communication device 1201 may be coupled together by one or more buses, which may include a power bus, a control signal bus, a status signal bus, a data bus, etc. For the sake of clarity, the various buses are illustrated in FIG. 10 as a bus system 1219.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

No claim element is to be construed under the provisions of 35 U.S.C. § 112, sixth paragraph, unless the element is expressly recited using the phrase "means for" or, in the case of a method claim, the element is recited using the phrase "step for."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5-6, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for improved random access procedures by a user equipment (UE), comprising:
   measuring a common channel state information reference signal (CSI-RS);
   selecting a horizontal/vertical beam from a set of fixed beams;
   determining a preamble mapped to the selected horizontal/vertical beam;

transmitting the preamble; and
receiving a random access response (RAR), wherein the RAR is mapped to a UE-specific search space using an enhanced random access radio network temporary identity (RA-RNTI) based on a sum of factors including an identifier of the selected horizontal/vertical beam, and wherein the RAR is multicast to UEs that report a same horizontal/vertical beam.

2. The method of claim 1, wherein the preamble is transmitted to an evolved NodeB (eNB) as part of a random access procedure.

3. The method of claim 1, wherein the mapping of the preamble to the selected horizontal/vertical beam is preconfigured.

4. A method for improved random access procedures by an evolved NodeB (eNB), comprising:
broadcasting a common channel state information reference signal (CSI-RS);
receiving a preamble from a user equipment (UE);
determining a selected horizontal/vertical beam for the UE based on the received preamble;
mapping a physical downlink control channel (PDCCH) grant of a random access response (RAR) to a UE-specific search space using an enhanced random access radio network temporary identity (RA-RNTI) based on a sum of factors including an identifier of the selected horizontal/vertical beam; and
transmitting the RAR to the UE using the selected horizontal/vertical beam, wherein the RAR is multicast to UEs that report a same horizontal/vertical beam.

5. The method of claim 4, wherein the preamble is received as part of a random access procedure.

6. The method of claim 4, wherein the mapping of the preamble to the selected horizontal/vertical beam is preconfigured.

7. The method of claim 4, wherein all preambles are grouped in several groups, wherein each group corresponds to one horizontal/vertical beam.

8. The method of claim 4, wherein new sets of preambles are defined for each horizontal/vertical beam.

9. A wireless communication device, comprising:
at least one processor configured to:
measure a common channel state information reference signal (CSI-RS),
select a horizontal/vertical beam from a set of fixed beams,
determine a preamble mapped to the selected horizontal/vertical beam,
transmit the preamble, and
receive a random access response (RAR), wherein the RAR is mapped to a UE-specific search space using an enhanced random access radio network temporary identity (RA-RNTI) based on a sum of factors including an identifier of the selected horizontal/vertical beam, and wherein the RAR is multicast to UEs that report a same horizontal/vertical beam; and
a memory coupled to the at least one processor.

10. The wireless communication device of claim 9, wherein the preamble is transmitted to an evolved NodeB (eNB) as part of a random access procedure.

11. The wireless communication device of claim 9, wherein the mapping of the preamble to the selected horizontal/vertical beam is preconfigured.

12. A base station, comprising:
at least one processor configured to:
broadcast a common channel state information reference signal (CSI-RS),
receive a preamble from a user equipment (UE),
determine a selected horizontal/vertical beam for the UE based on the received preamble,
map a physical downlink control channel (PDCCH) grant of a random access response (RAR) to a UE-specific search space using an enhanced random access radio network temporary identity (RA-RNTI) based on a sum of factors including an identifier of the selected horizontal/vertical beam, and
transmit the RAR to the UE using the selected horizontal/vertical beam; and
a memory coupled to the at least one processor, wherein the RAR is multicast to UEs that report a same horizontal/vertical beam.

13. The base station of claim 12, wherein the preamble is received as part of a random access procedure.

14. The base station of claim 12, wherein the mapping of the preamble to the selected horizontal/vertical beam is preconfigured.

15. The base station of claim 12, wherein all preambles are grouped in several groups, wherein each group corresponds to one horizontal/vertical beam.

16. The base station of claim 12, wherein new sets of preambles are defined for each horizontal/vertical beam.

17. An apparatus, comprising:
means for measuring a common channel state information reference signal (CSI-RS);
means for selecting a horizontal/vertical beam from a set of fixed beams;
means for determining a preamble mapped to the selected horizontal/vertical beam;
means for transmitting the preamble; and
means for receiving a random access response (RAR), wherein the RAR is mapped to a UE-specific search space using an enhanced random access radio network temporary identity (RA-RNTI) based on a sum of factors including an identifier of the selected horizontal/vertical beam, and wherein the RAR is multicast to UEs that report a same horizontal/vertical beam.

18. The apparatus of claim 17, wherein the preamble is transmitted to an evolved NodeB (eNB) as part of a random access procedure.

19. The apparatus of claim 17, wherein the mapping of the preamble to the selected horizontal/vertical beam is preconfigured.

20. An apparatus, comprising:
means for broadcasting a common channel state information reference signal (CSI-RS);
means for receiving a preamble from a user equipment (UE);
means for determining a selected horizontal/vertical beam for the UE based on the received preamble;
means for mapping a physical downlink control channel (PDCCH) grant of a random access response (RAR) to a UE-specific search space using an enhanced random access radio network temporary identity (RA-RNTI) based on a sum of factors including an identifier of the selected horizontal/vertical beam; and
means for transmitting the RAR to the UE using the selected horizontal/vertical beam, wherein the RAR is multicast to UEs that report a same horizontal/vertical beam.

21. The apparatus of claim 20, wherein the preamble is received as part of a random access procedure.

22. The apparatus of claim 20, wherein the mapping of the preamble to the selected horizontal/vertical beam is preconfigured.

23. The apparatus of claim 20, wherein all preambles are grouped in several groups, wherein each group corresponds to one horizontal/vertical beam.

24. The apparatus of claim 20, wherein new sets of preambles are defined for each horizontal/vertical beam.

25. A non-transitory tangible computer-readable medium storing computer-executable code, comprising:
   code for causing a wireless communication device to measure a common channel state information reference signal (CSI-RS);
   code for causing the wireless communication device to select a horizontal/vertical beam from a set of fixed beams;
   code for causing the wireless communication device to determine a preamble mapped to the selected horizontal/vertical beam;
   code for causing the wireless communication device to transmit the preamble; and
   code for causing the wireless communication device to receive a random access response (RAR), wherein the RAR is mapped to a UE-specific search space using an enhanced random access radio network temporary identity (RA-RNTI) based on a sum of factors including an identifier of the selected horizontal/vertical beam, and wherein the RAR is multicast to UEs that report a same horizontal/vertical beam.

26. The non-transitory tangible computer-readable medium of claim 25, wherein the preamble is transmitted to an evolved NodeB (eNB) as part of a random access procedure.

27. The non-transitory tangible computer-readable medium of claim 25, wherein the mapping of the preamble to the selected horizontal/vertical beam is preconfigured.

28. A non-transitory tangible computer-readable medium storing computer-executable code, comprising:
   code for causing a base station to broadcast a common channel state information reference signal (CSI-RS);
   code for causing the base station to receive a preamble from a user equipment (UE);
   code for causing the base station to determine a selected horizontal/vertical beam for the UE based on the received preamble;
   code for causing the base station to map a physical downlink control channel (PDCCH) grant of a random access response (RAR) to a UE-specific search space using an enhanced random access radio network temporary identity (RA-RNTI) based on a sum of factors including an identifier of the selected horizontal/vertical beam; and
   code for causing the base station to transmit the RAR to the UE using the selected horizontal/vertical beam, wherein the RAR is multicast to UEs that report a same horizontal/vertical beam.

29. The non-transitory tangible computer-readable medium of claim 28, wherein the preamble is received as part of a random access procedure.

30. The non-transitory tangible computer-readable medium of claim 28, wherein the mapping of the preamble to the selected horizontal/vertical beam is preconfigured.

31. The non-transitory tangible computer-readable medium of claim 28, wherein all preambles are grouped in several groups, wherein each group corresponds to one horizontal/vertical beam.

32. The non-transitory tangible computer-readable medium of claim 28, wherein new sets of preambles are defined for each horizontal/vertical beam.

* * * * *